United States Patent [19]

Sakamoto

[11] 4,341,133
[45] Jul. 27, 1982

[54] CONTROL SYSTEM FOR A HYDRAULICALLY DRIVEN VEHICLE

[75] Inventor: Masaaki Sakamoto, Kaga, Japan

[73] Assignee: Kabushiki Kaisha Komatsu Seisakusho, Tokyo, Japan

[21] Appl. No.: 154,963

[22] Filed: May 30, 1980

[30] Foreign Application Priority Data

May 31, 1979 [JP] Japan .................. 54-72392

[51] Int. Cl.³ .......................................... F16H 47/00
[52] U.S. Cl. ...................................... 74/733; 74/645; 74/655; 74/730; 74/752 C
[58] Field of Search ............. 74/733, 752 C, 730, 74/732, 687, 645, 655

[56] References Cited

U.S. PATENT DOCUMENTS

| | | | |
|---|---|---|---|
| 3,081,647 | 3/1963 | Blenkle | 74/687 X |
| 3,085,448 | 4/1963 | Finlayson | 74/687 |
| 3,302,487 | 2/1967 | Kempson | 74/733 |
| 3,463,034 | 8/1969 | Miller | 74/733 |
| 4,078,452 | 3/1978 | Rosler | 74/752 C |

FOREIGN PATENT DOCUMENTS

| | | | |
|---|---|---|---|
| 2260667 | 12/1972 | Fed. Rep. of Germany | 74/730 |
| 2307550 | 8/1974 | Fed. Rep. of Germany | 74/687 |
| 2307100 | 9/1974 | Fed. Rep. of Germany | 74/687 |
| 2363086 | 7/1975 | Fed. Rep. of Germany | 74/730 |
| 2409684 | 9/1975 | Fed. Rep. of Germany | 74/730 |
| 2411432 | 9/1975 | Fed. Rep. of Germany | 74/730 |
| 2363333 | 10/1975 | Fed. Rep. of Germany | 74/730 |
| 2427112 | 1/1976 | Fed. Rep. of Germany | 74/730 |

*Primary Examiner*—Leslie Braun
*Attorney, Agent, or Firm*—Armstrong, Nikaido, Marmelstein & Kubovcik

[57] ABSTRACT

A control system for a hydraulically driven vehicle having a pair of variable displacement hydraulic pumps driven by an engine and a pair of hydraulic motors each being connected with the respective variable displacement hydraulic pumps in a closed loop and driven thereby. The control system comprises a pair of servo valves each for controlling the displacement of the respective variable displacement hydraulic pumps, a servo control valve for controlling the servo valve and a manually operated change-over valve connected with a fixed displacement charge pump and with the servo control valve, the change-over valve being normally held in a communication position and being adapted to be changed over to an offset position when operated where the output side of the fixed displacement charge pump is connected with a tank.

3 Claims, 1 Drawing Figure

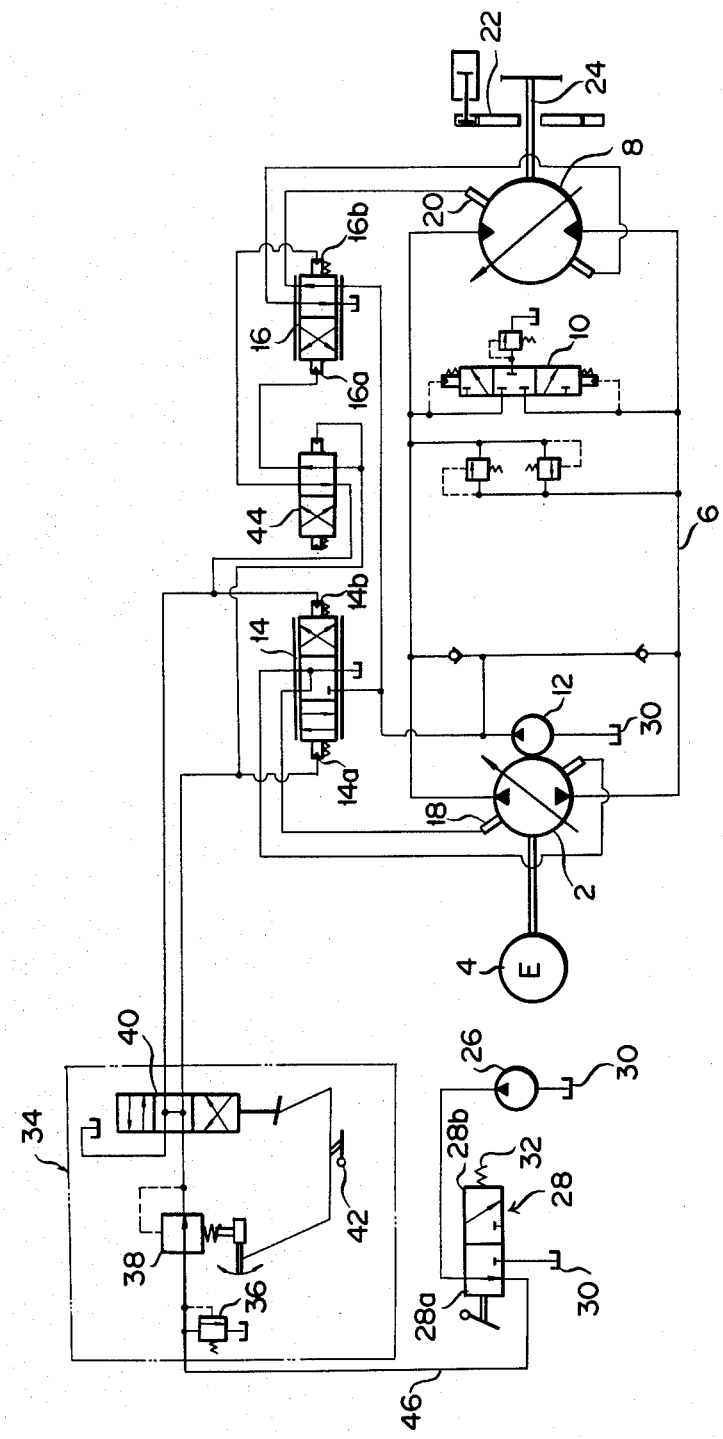

CONTROL SYSTEM FOR A HYDRAULICALLY DRIVEN VEHICLE

BACKGROUND OF THE INVENTION

This invention relates to a control system for a hydraulically driven vehicle.

A hydraulically driven vehicle is generally provided with a pair of independent closed loops each for driving one side of tracks or wheels of the vehicle. Each closed loop includes a variable displacement hydraulic pump driven by a prime mover such as an engine and a fixed displacement or variable displacement hydraulic motor driven by the variable displacement hydraulic pump. Displacement volume of each variable displacement hydraulic pump is controlled by changing the angle of a swash plate, which is controlled and operated by a servo valve.

Each servo valve is controlled by a servo control valve means comprising a pressure regulator and a directional control valve for a forward and reverse change-over. Both the pressure regulator and the directional control valve are operated by a speed control lever. By manipulating the speed control lever, the speed of the vehicle and the forward and reverse change-over can be realized. In a conventional hydraulically driven vehicle, however, since speed of the vehicle is controlled by manipulating the speed control lever, speed control of the vehicle becomes troublesome where a frequent starting and stopping operation of the vehicle is required for the driver. It has also been difficult to attain the same speed of the vehicle as the previous speed after the vehicle is stopped and restarted since speed of the hydraulically driven vehicle is generally changed infinitely.

SUMMARY OF THE INVENTION

It is therefore an object of the present invention to provide a control system for a hydraulically driven vehicle wherein a repeated starting and stopping operation of the vehicle can easily be attained.

Another object of the present invention is to provide a control system for a hydraulically driven vehicle wherein the vehicle can run at the same speed as the previously running speed after the vehicle is once stopped and restarted thereby providing an easy and reliable speed control of the vehicle.

In accordance with an aspect of the present invention, there is provided a control system for a hydraulically driven vehicle including a variable displacement hydraulic pump driven by a prime mover, and a hydraulic motor connected with said variable displacement hydraulic pump in a closed loop and driven thereby, said control system comprising in combination: a fixed displacement first charge pump driven by said prime mover; a pilot-operated servo valve means for controlling the displacement of said variable displacement hydraulic pump, said pilot-operated servo valve means having a pilot port formed therein and being connected with said first charge pump; a fixed displacement second charge pump driven by said prime mover; a manually operated change-over valve means connected at the input side thereof with said second charge pump, said change-over valve means having formed therein a communication position and an offset position and normally held in the communication position and adapted to be changed over to the offset position where the output side of said second charge pump is connected to a tank therethrough; and servo control valve means connected at the input side with said change-over valve means and at the output side with the pilot port of said pilot-operated servo valve means.

Due to the provision of the change-over valve in the control system, a frequent and repeated starting and stopping operation of the vehicle can easily be attained by merely manipulating the change-over valve leaving the speed control lever untouched. Besides, since stopping and starting operation can be controlled by the manipulation of the change-over valve, a constant speed of the vehicle can be readily realized in spite of the repeated starting and stopping operation.

The above and other objects, features and advantages of the present invention will be readily apparent from the following description taken in conjunction with the accompanying drawing.

BRIEF DESCRIPTION OF THE DRAWING

Accompanying drawing is a hydraulic circuit of a control system for a hydraulically driven vehicle according to the present invention.

DESCRIPTION OF THE PREFERRED EMBODIMENT

The present invention will now be described in detail with reference to the accompanying drawing. Although a hydraulically driven vehicle is generally provided with a pair of closed loops for driving both sides of tracks or wheels, only side of closed loops is shown and explained herein for the purpose of simplification.

Reference numeral 2 denotes a variable displacement hydraulic pump driven by an engine 4. Connected with the variable displacement hydraulic pump 2 in a closed loop 6 and driven thereby is a variable displacement hydraulic motor 8. A flashing valve 10 is connected in parallel with the variable displacement hydraulic motor 8.

A fixed displacement charge pump 12 is connected with both pilot-operated servo valves 14 and 16. Therefore, hydraulic fluid from the charge pump 12 is adapted to be selectively introduced through both the pilot-operated servo valves 14 and 16 into servo control actuators 18 and 20 of the variable displacement hydraulic pump 2 and motor 8, respectively, thereby changing the displacements thereof.

A parking brake 22 is mounted on an output shaft 24 of the variable displacement hydraulic motor 8.

Reference numeral 26 denotes another fixed displacement charge pump driven by the engine 4, the output side of which is connected with a manually operated change-over valve or directional control valve 28. The change-over valve 28 has two positions formed therein, namely a communication position 28a and an offset position 28b where the output side of the charge pump 26 is communicated with a tank 30 and the change-over valve 28 is normally held in the communication position 28a by the action of the force of a spring 32.

Disposed between the change-over valve 28 and the servo valve 14 is a servo control valve means 34 comprising a relief valve 36, a pressure regulator 38 for setting the speed of the vehicle and a manually operated directional control valve 40 for forward and reverse change-over of the vehicle. The pressure regulator 38 and the directional control valve 40 are operated simultaneously by a single lever 42 such as speed control lever.

The output side of the directional control valve 40 is connected with pilot ports 14a and 14b of the servo valve 14 and with pilot ports 16a and 16b of the servo valve 16 through a shuttle valve 44.

In the operation, since the change-over valve 28 is normally held in the communication position 28a, hydraulic fluid from the charge pump 26 is normally introduced into a pilot circuit line 46. Therefore, by controlling the pressure regulator 38 for setting the speed of the vehicle and the directional control valve 40 for the forward and reverse change-over of the vehicle simultaneously by the manipulation of the lever 42, the servo valves 14 and 16 are operated. As a result, controlled amounts of hydraulic fluid from the charge pump 12 may be introduced into the servo control actuators 18 and 20 of the variable displacement hydraulic pump 2 and motor 8, respectively, thus changing displacements thereof.

Therefore by manipulating the lever 42, the vehicle can run either forwardly or reversely with a controlled speed.

When repeated starting and stopping operations for the vehicle are required, the driver must operate the lever 42 repeatedly in a conventional control system. However, such repeating operations of the lever 42 is troublesome for the driver. Besides, it is difficult to readjust the lever 42 and obtain the same speed of the vehicle as the previously running speed after the vehicle is once stopped and then restarted.

According to the essence of the present invention, however, since the change-over valve 28 is provided in the pilot circuit line 46 on the upstream side relative to the servo control valve means 34, repeated and frequent starting and stopping operations of the vehicle can be achieved by merely operating the change-over valve 28 between its communication position 28a and offset position 28b where the output side of the charge pump 26 is connected with the tank 30 and therefore the vehicle is stopped. And also it is easy to regain the same speed of the vehicle.

While the single preferred embodiment of the present invention has been shown and described herein, it is to be understood that the embodiment is illustrative only and not to be taken a definition of the scope of the invention, reference being made for this purpose to the appended claims.

What I claim is:

1. A control system for a hydraulically driven vehicle including a variable displacement hydraulic pump driven by a prime mover, and a hydraulic motor connected with said variable displacement hydraulic pump in a closed loop and driven thereby, said control system comprising in combination:

a fixed displacement first charge pump driven by said prime mover;

a pilot-operated servo valve means for controlling the displacement of said variable displacement hydraulic pump, said pilot-operated servo valve means having a pilot port formed therein and being connected with said first charge pump;

a fixed displacement second charge pump driven by said prime mover;

a manually operated change-over valve means connected at the input side thereof to said second charge pump, said change-over valve means having a communication position and an offset position said change-over valve means being normally held in the communication position, said change-over valve means being changed over to the offset position for connecting the output side of said second charge pump to a tank; and servo control valve means connected at the input side thereof with said change-over valve means and at the output side with the pilot port of said pilot-operated servo valve means, wherein when said change-over valve means is in the communication position, said servo control valve means is connected to said second charge pump through said change-over valve means.

2. A control system for a hydraulically driven vehicle as recited in claim 1 wherein said servo control valve means comprises a pressure regulator and a directional control valve for forward and reverse change-over of the vehicle.

3. A control system for a hydraulically driven vehicle as recited in claim 1 or 2 wherein said hydraulic motor is variable displacement type and another pilot-operated servo valve means is disposed between said servo control valve means and said variable displacement hydraulic motor for controlling the displacement thereof.

* * * * *